Aug. 14, 1928.

F. D. SPEAR 1,681,140

KEROSENE SIGNALING LAMP

Filed June 17, 1924

INVENTOR
Furman D. Spear
BY
ATTORNEY

Patented Aug. 14, 1928.

1,681,140

UNITED STATES PATENT OFFICE.

FURMAN D. SPEAR, OF NEW YORK, N. Y., ASSIGNOR TO ARMSPEAR MANUFACTURING COMPANY, OF NEW YORK, N. Y., A CORPORATION OF NEW YORK.

KEROSENE SIGNALING LAMP.

Application filed June 17, 1924. Serial No. 720,507.

My invention relates particularly to lamps intended to be used in railway signaling. Such lamps as embodied in the usual signaling lantern are subject to very rough usage and must pass the most careful tests for safety and reliability in operation.

It had been proposed in the past to fill the font or pot of an ordinary lamp with absorbent cotton or the like so that there would be no leakage of oil. It has been found, however, that such absorbent material becomes matted or soggy so that it is ineffective for the safety purpose with which it was designed. On account of the way the ordinary lamp pot is made it is very difficult to fill it with the absorbent material and practically impossible to get the material out so as to refill it. I therefore propose to reconstruct the pot so as to utilize the advantages of the packing and at the same time make it possible to readily remove the old filling and replace it when desired.

Figure 1:
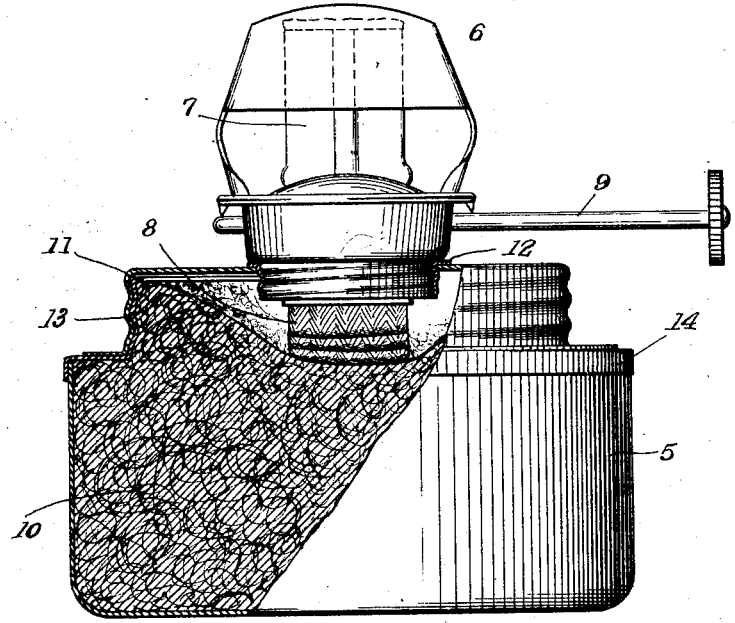
Fig. 1 is a vertical section and side elevation of a lamp embodying improvements of my invention.
Figure 2:
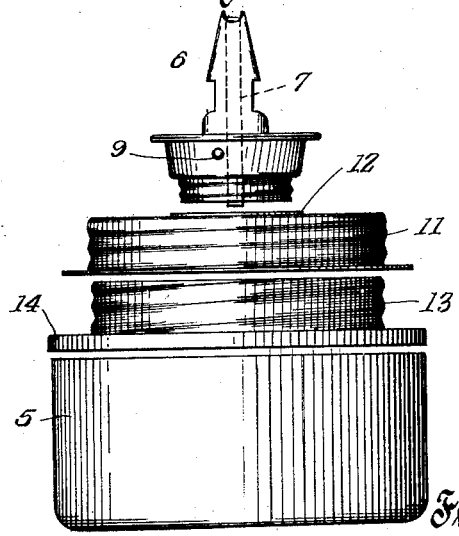
Fig. 2 is a side view showing the parts of the lamp separated.

The pot or body of the lamp 5 may be of any suitable construction such as drawn or spun sheet metal of any suitable design. The burner 6 may also be of any suitable design and preferably provided with a wick tube 7 to accommodate an ordinary woven wick 8. I also prefer to provide some form of means such as a spindle 9 and the usual toothed wheels for adjusting the wick up and down.

The body of the pot I substantially fill with absorbent material such as cotton 10 with which the lower portion of the wick 8 engages.

The upper part of the pot is provided with a large opening extending over substantially the major part of the pot and adapted to be closed by a detachable cover 11 which carries a seat 12 for the burner 6 so that the burner can be attached to or detached from the cover 11.

The cover has a detachable connection with the pot for instance by means of a screw threaded joint on the neck 13. For convenience in construction I may form a neck 13 on a separate ring having a flange 14 secured in suitable manner as, for instance, by a suitable double seam, to the upper edge of the pot 5. This ring serves to retain the filling or packing 10 when the cover is removed so that the filling will not accidentally fall out. On account of the large opening in the ring, however, it is very easy to remove the filling when it is desired. This cover may, if desired, be secured directly to the pot by a slip joint, bayonet joint or a screw thread.

Since the filling absorbs all the oil which is placed in the pot there is no danger of the oil leaking out when the lantern is swung around in the usual method of signaling. It should be understood of course that I do not desire to be limited to the exact means shown for connecting the cover to the body of the lamp except as the same is required by the terms of the claims.

I claim:

1. An oil signaling lamp having an open top body designed to hold absorbent material, a narrow ring fitting over the outside edge of said top and providing a relatively large opening for the insertion and removal of said absorbent material, a cover to hold in said absorbent material and a burner supported centrally in said cover with a wick depending therefrom into contact with said absorbent material.

2. A kerosene lamp comprising a pot, absorbent material substantially filling said pot and having a recess in its upper part, a top ring having an outer, depending flange surrounding the upper edge of the pot and holding said material in place and having an opening over said recess, a burner detachably mounted in said opening, a wick carried by said burner and having its lower end crumpled up and movable in said recess in direct contact with the absorbent material in said pot.

FURMAN D. SPEAR.